(12) United States Patent
Johnson et al.

(10) Patent No.: US 10,207,231 B1
(45) Date of Patent: Feb. 19, 2019

(54) OVERHEAD FAN MISTING SYSTEM AND METHOD THEREFOR

(71) Applicant: MistAmerica, Corp., Scottsdale, AZ (US)

(72) Inventors: David B. Johnson, Scottsdale, AZ (US); Bret T. Rogers, Scottsdale, AZ (US)

(73) Assignee: MISTAMERICA, CORP., Scottsdale, AZ (US)

( * ) Notice: Subject to any disclaimer, the term of this patent is extended or adjusted under 35 U.S.C. 154(b) by 160 days.

(21) Appl. No.: 15/423,878

(22) Filed: Feb. 3, 2017

(51) Int. Cl.
*B01F 3/04* (2006.01)
*F04D 25/08* (2006.01)
*F24F 6/16* (2006.01)

(52) U.S. Cl.
CPC .......... *B01F 3/04049* (2013.01); *F04D 25/08* (2013.01); *F24F 6/16* (2013.01)

(58) Field of Classification Search
CPC .......... B01F 3/04049; F24F 6/16; F04D 25/08
See application file for complete search history.

(56) References Cited

U.S. PATENT DOCUMENTS

| | | | | |
|---|---|---|---|---|
| 942,712 A * | 12/1909 | Comins | ................ | A61M 16/16 261/30 |
| 2,557,276 A * | 6/1951 | Gerow | .................. | F24F 5/0035 261/28 |
| 4,473,382 A * | 9/1984 | Cheslock | ................ | B03C 3/155 361/231 |
| 5,277,655 A * | 1/1994 | Storkan | .............. | B60H 1/00378 454/143 |
| 6,257,501 B1 * | 7/2001 | Roach | ..................... | B05B 1/207 239/214 |
| 6,257,502 B1 * | 7/2001 | Hanish | ..................... | B05B 1/14 239/290 |
| 6,298,866 B1 * | 10/2001 | Molnar, IV | .............. | A45B 3/00 108/50.12 |
| 6,786,701 B1 * | 9/2004 | Huang | .................. | F04D 29/705 239/77 |
| 8,496,232 B1 * | 7/2013 | Nelson | .................. | F24F 5/0035 261/28 |
| 2007/0092375 A1 * | 4/2007 | Liu | ......................... | F04D 25/08 416/63 |
| 2008/0251611 A1 * | 10/2008 | Delattre | ................ | F04D 29/705 239/463 |
| 2009/0195982 A1 * | 8/2009 | Wu | ........................... | G06F 1/20 361/695 |
| 2009/0283606 A1 * | 11/2009 | Terrell | .................. | F24F 5/0035 239/14.1 |
| 2012/0318179 A1 * | 12/2012 | Noeth | .................... | A47B 37/00 108/50.13 |
| 2013/0004349 A1 * | 1/2013 | Haaf | ..................... | F04D 29/329 417/423.7 |

(Continued)

*Primary Examiner* — Stephen Hobson
(74) *Attorney, Agent, or Firm* — Weiss & Moy, P.C.; Jeffrey D. Moy

(57) ABSTRACT

A misting system has a fan unit. A housing is provided having an opening formed there through. The fan unit is positioned within the opening. A plurality of apertures is formed in a bottom section of the housing. A plurality of misting nozzles is provided, wherein an individual misting nozzle is positioned proximate each aperture. A cap is positioned over the opening in a bottom section of the housing. A plurality of channels is formed in the cap, wherein a channel is aligned with each of the plurality of misting nozzles.

18 Claims, 5 Drawing Sheets

(56) References Cited

U.S. PATENT DOCUMENTS

| | | | | |
|---|---|---|---|---|
| 2014/0174672 A1* | 6/2014 | Boulter | .................... | C02F 1/048 |
| | | | | 159/4.2 |
| 2014/0255150 A1* | 9/2014 | Di Falco | ................. | F04D 29/54 |
| | | | | 415/1 |
| 2015/0054181 A1* | 2/2015 | Martin | ................... | F04D 29/705 |
| | | | | 261/28 |
| 2015/0247644 A1* | 9/2015 | Stearns | ..................... | F24F 6/14 |
| | | | | 261/37 |
| 2015/0252812 A1* | 9/2015 | Sauer | ..................... | F04D 25/08 |
| | | | | 417/423.14 |
| 2016/0290348 A1* | 10/2016 | Mornan | .................. | F04D 17/06 |
| 2016/0354623 A1* | 12/2016 | Mueller | ............... | A62C 3/0207 |
| 2017/0122605 A1* | 5/2017 | Lee | ........................... | F24F 3/16 |
| 2017/0312704 A1* | 11/2017 | Godinez | ............. | B01F 3/04035 |
| 2018/0238337 A1* | 8/2018 | Kneip | ................. | F04D 25/0606 |

* cited by examiner

OVERHEAD FAN MISTING SYSTEM AND METHOD THEREFOR

TECHNICAL FIELD

The present application in general relates to a misting system, and more specifically, to an overhead fan misting system that is able to extend the area around the overhead fan where the temperature reduction may be felt by users.

BACKGROUND

Misting systems may be installed in residential and commercial outdoor areas as an energy-efficient way to cool the surrounding outdoor areas where the misting system is installed. Misting systems may generally consist of tubing connected to a water pump, which, in turn, is connected to a water supply. The tubing may have a plurality of fine openings and/or nozzles running the length of the tubing. The openings and/or nozzles may be used so that the water flowing through the tubing may be dispersed in the form of a mist.

Misting systems may be able to lower the temperature in the area where the misting system is installed in the following manner. When water molecules evaporate into the air, the water changes from a liquid to a gas state. A certain amount of energy or heat is needed to assist this process of changing water from a liquid to a gas, which is automatically drawn from the surrounding air, thus lowering the ambient temperature around the misted area.

Unfortunately, the effectively cooling area of most misting systems is limited. To try and increase the cooling area, misting systems have incorporated fans and/or air blowers to direct water-bearing airflows toward the area to be cooled. While the cooling area may be increased by using fans/blowers, the cooling area is limited to the size and speed of the fan. Unfortunately, increasing the size and/or speed of the fans/blowers creates several issues. First, higher-velocity fans/blowers tend to be large and bulky. Further, higher-velocity fans/blowers tend to be too noisy. Some of these higher-velocity fans/blowers may be so loud that it may be difficult to hear others conversing around you.

Therefore, it would be desirable to provide a system and method that overcomes the above.

SUMMARY

In accordance with one embodiment, a misting system is disclosed. The misting system has a fan unit. A housing is provided having an opening formed there through. The fan unit is positioned within the opening. A plurality of apertures is formed in a bottom section of the housing. A plurality of misting nozzles is provided, wherein an individual misting nozzle is positioned proximate each aperture. A cap is positioned over the opening in a bottom section of the housing. A plurality of channels is formed in the cap, wherein a channel is aligned with each of the plurality of misting nozzles In accordance with one embodiment, a misting system is disclosed. The misting system has a fan unit. A housing is provided and has a hollow interior. An opening is formed through a central area of the housing. The fan unit is positioned within the opening. A plurality of apertures is formed in a bottom section of the housing. A misting distribution unit is positioned within the hollow interior of the housing unit. A plurality of misting nozzles of the misting distribution unit is provided, wherein an individual misting nozzle dispersing a mist out of each aperture. A cap is positioned over the opening in a bottom section of the housing. A plurality of channels is formed in the cap, wherein a channel is aligned with each of the plurality of misting nozzles.

In accordance with one embodiment, a misting system is disclosed. The misting system has a axial fan unit. A housing is provided having a hollow interior section. An opening is formed through the housing. The fan unit is positioned within the opening. A plurality of apertures is formed in a bottom section of the housing. A misting distribution unit is positioned within the interior of the housing. An individual nozzle of the misting distribution unit distributing a mist out of each aperture. A plurality of channels is formed over the opening, wherein a channel is aligned with each of the plurality of misting nozzles, the plurality of channels extending down and away from the opening forming a trough. A mounting unit is coupled to the fan unit.

BRIEF DESCRIPTION OF THE DRAWINGS

The present application is further detailed with respect to the following drawings. These figures are not intended to limit the scope of the present invention but rather illustrate certain attributes thereof.

DESCRIPTION OF THE APPLICATION

The description set forth below in connection with the appended drawings is intended as a description of presently preferred embodiments of the disclosure and is not intended to represent the only forms in which the present disclosure can be constructed and/or utilized. The description sets forth the functions and the sequence of steps for constructing and operating the disclosure in connection with the illustrated embodiments. It is to be understood, however, that the same or equivalent functions and sequences can be accomplished by different embodiments that are also intended to be encompassed within the spirit and scope of this disclosure.

Embodiments of the exemplary system and method relates to a misting system. The misting system uses a fan to increase the cooling effect of the misting system. The misting system has a plurality of chutes positioned below the fan. The chutes may be used to direct an air flow from the fan. A nozzle may be positioned above one or more of the chutes. By positioning the nozzles above the chutes, the cooling area of the misting system may be increased.

Figure 1:
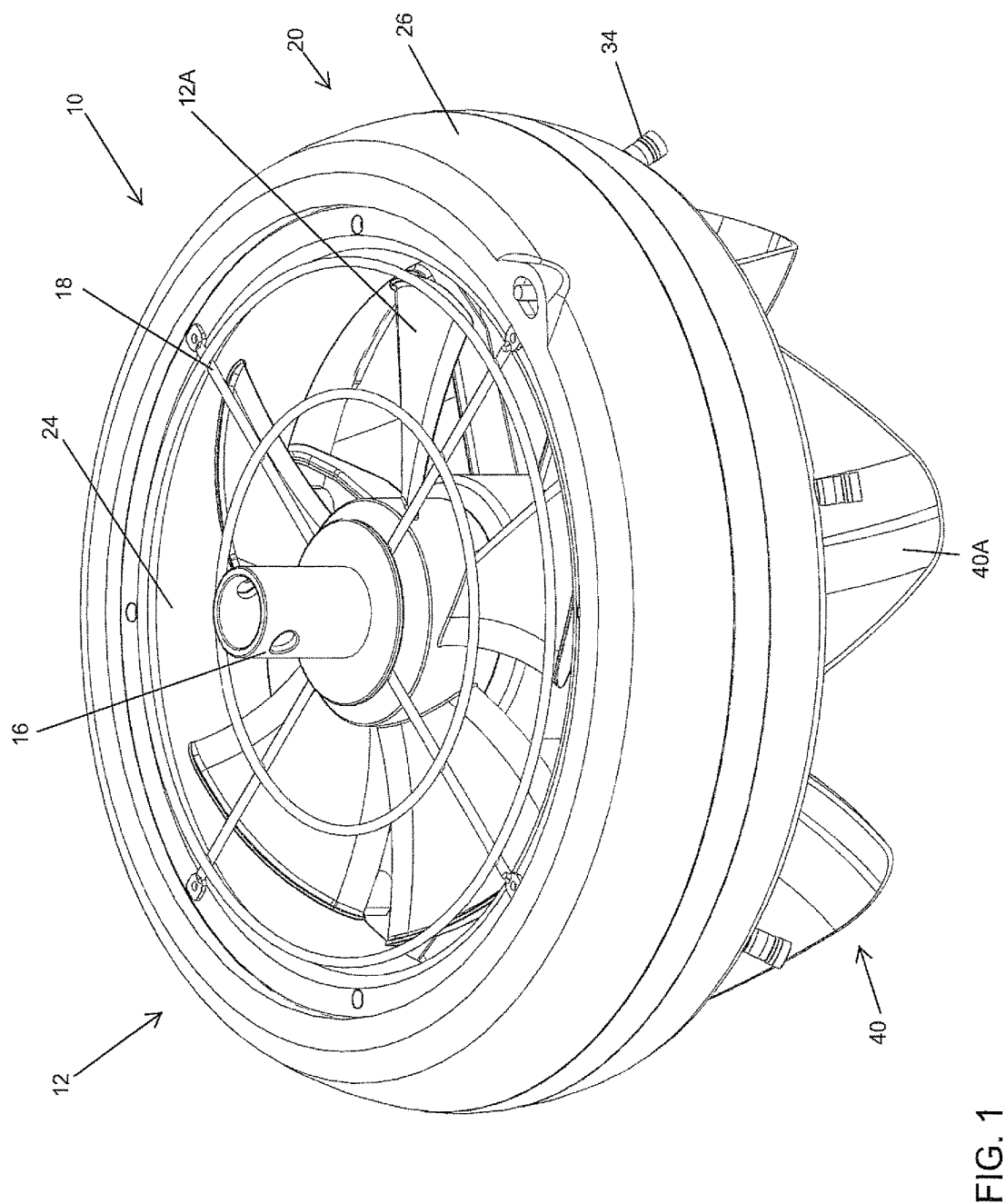
FIG. 1 is an elevated perspective view of a misting fan according to one aspect of the present application.
Figure 2:
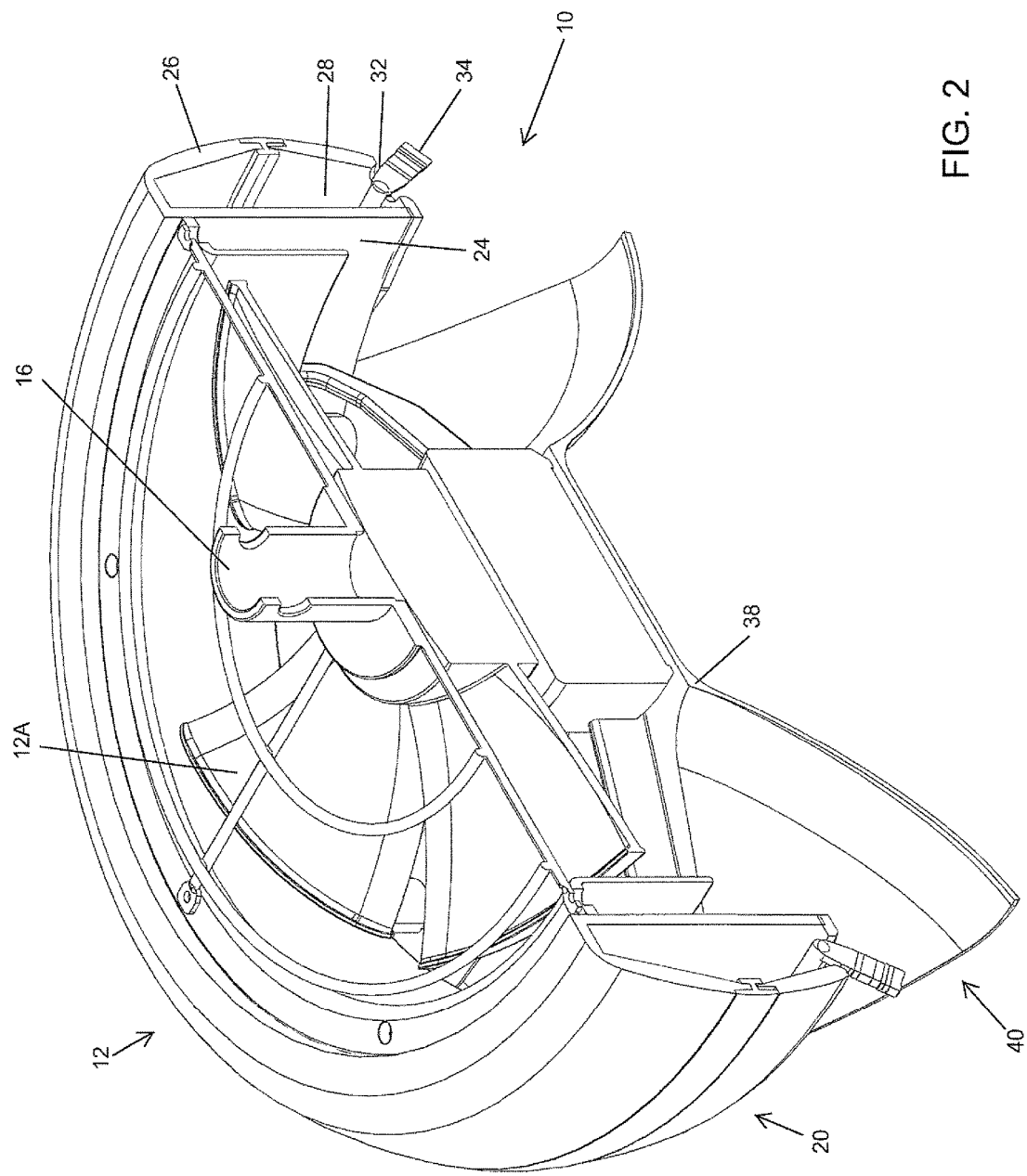
FIG. 2 is an elevated perspective view of the misting fan depicted in FIG. 1 with a portion of the misting fan cut away in accordance with one aspect of the present application.
Figure 3:
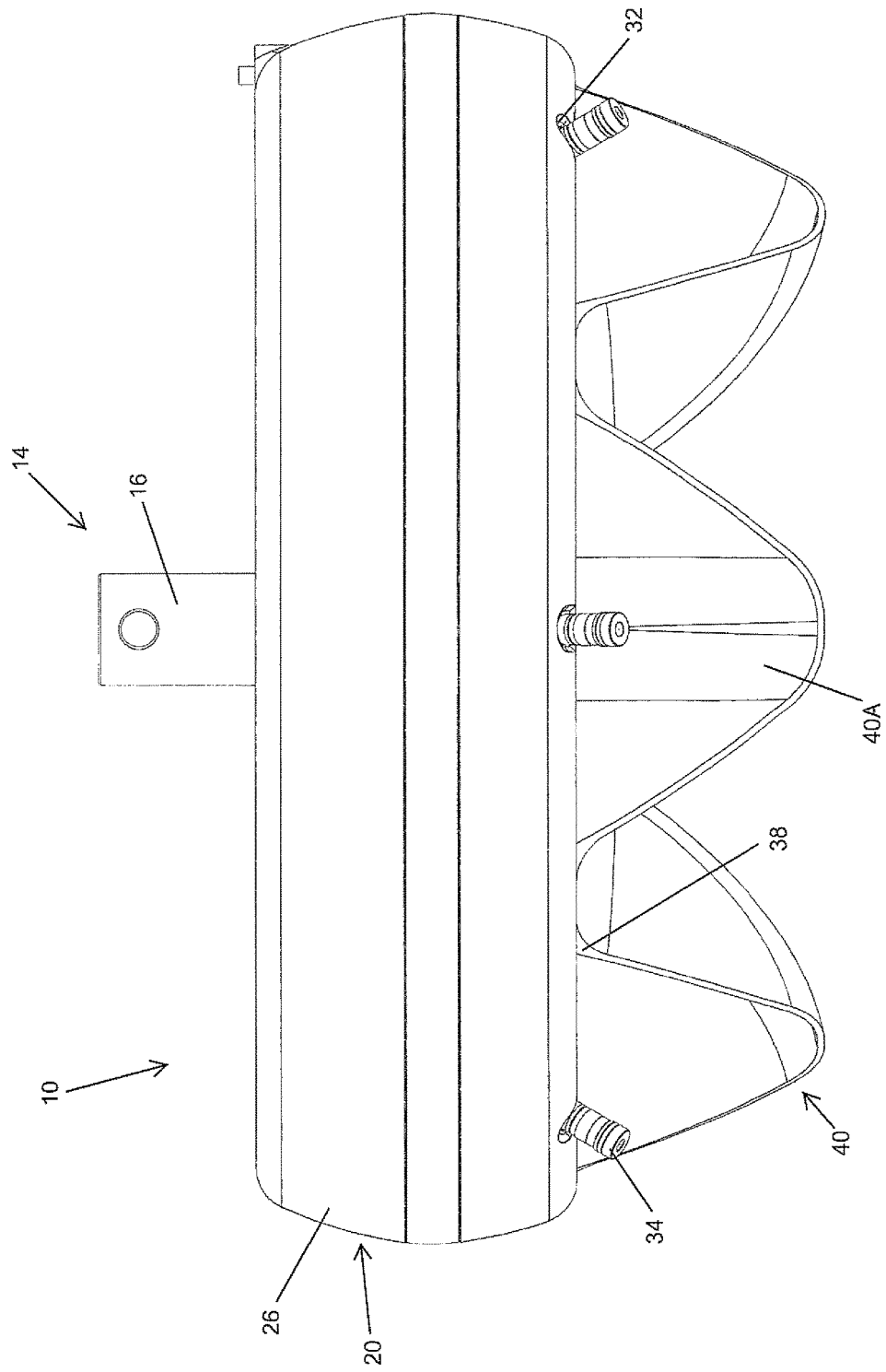
FIG. 3 is a front view of the misting fan depicted in FIG. 1 according to one aspect of the present application.
Figure 4:
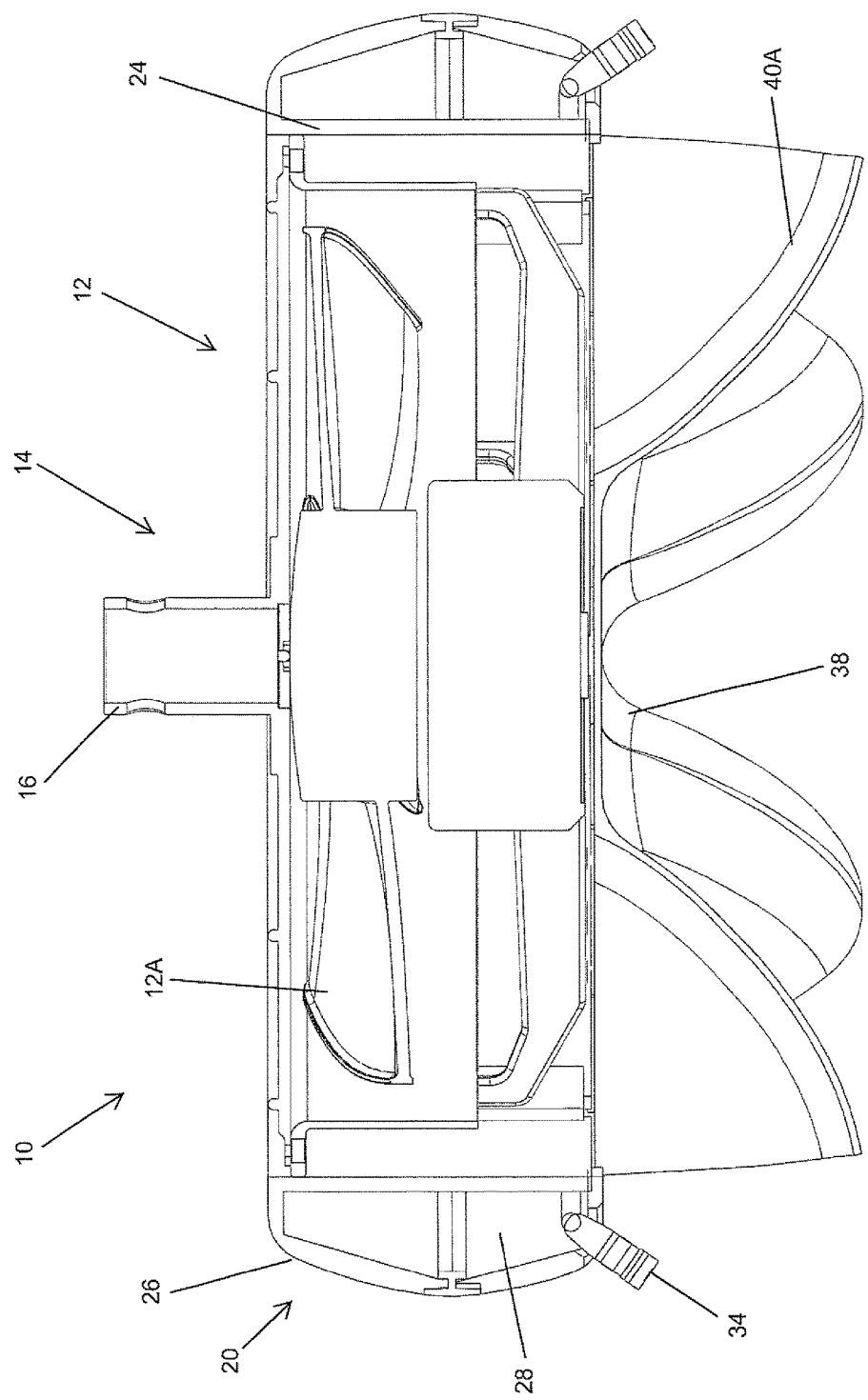
FIG. 4 is a front view of the misting fan depicted in FIG. 3 with a portion of the misting fan cut away in accordance with one aspect of the present application.
Figure 5:
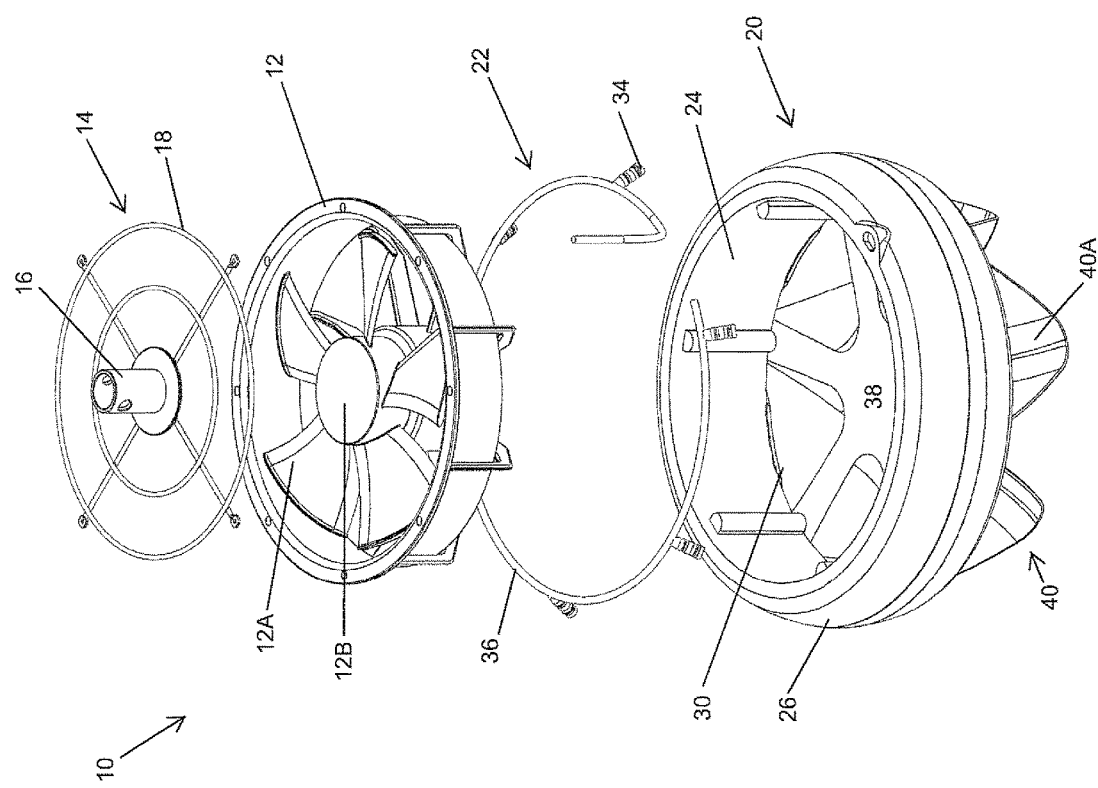
FIG. 5 is an exploded view of the misting fan depicted in FIG. 1 according to one aspect of the present application.

Referring now to FIGS. 1-5, a fan misting system 10 may be seen. The fan misting system 10 may have a fan unit 12. The fan unit 12 may be any type of fan. For example, the fan unit 12 may be a propeller fan, an axial fan or a similar type blowing device. In the embodiment shown in the FIGs., an axial fan may be seen. Axial fans are named for the direction of the airflow they create. The blades 12A of the axial fans rotating around an axis 12B draw air in parallel to that axis 12B and force the air out in the same direction. Axial fans may create airflow with a high flow rate, meaning they create a large volume of airflow. However, the airflows the axial fan creates are of low pressure. Thus, axial fans may require a low power input for operation and may be quieter than other types of fan units.

A mounting unit 14 may be coupled to the fan unit 12. The mounting unit 14 may be used to secure the misting system 10 to a ceiling. The mounting unit 14 may be comprised of a mount bracket 16. Extending down from the mount bracket 16 may be a screen 18. The screen 18 may be a protective screen to prevent objects from falling into the fan unit 12. The protective screen 18 may also prevent individuals from placing their hands and/or fingers into an open top area of the fan unit 12.

A housing unit 20 may be coupled to the fan unit 12. The housing unit 20 may be used to direct the airflow generated from the fan unit 12. The housing unit 20 may also be used to store and hold a mist distribution unit 22. The housing unit 20 may have an inner wall 24. The inner wall 24 may form an inner perimeter of the housing unit 20. An outer wall 26 may be coupled to the inner wall 24. The outer wall 26 may diverge away from the inner wall 24 to form a hollow interior section 28 of the housing unit 20. In accordance with one embodiment, the outer wall 26 may have a "C" shape wherein the inner portion of the "C" forms the interior section 28.

The housing unit 20 may have an opening 30 formed through a central area of the housing unit 20. The inner wall 24 may form a perimeter of the opening 30. The opening 30 may be formed to have a perimeter approximately equal to a size and shape of the fan unit 12. This may allow the fan unit 12 to be placed within the opening 30 directing airflow generated from the fan unit 12 down and out of the opening 30 formed in the housing unit 20.

In the present embodiment shown, the housing unit 20 may be shaped similar to a ring or a doughnut having a circular opening 30 through the housing unit 20. However, this is shown only as an example and should not be seen in a limiting manner. The housing unit 20 may take on other shapes without departing from the spirit and scope of the present invention. Similarly, the opening 30 may take on different shapes and/or sizes without departing from the spirit and scope of the present invention. The opening 30 may take on any shape that may correspond to the shape of the perimeter of the fan unit 12.

A plurality of apertures 32 may be formed in the housing unit 20. The apertures 32 may be formed around an outer perimeter of a bottom section of the housing unit 20. The apertures 32 may be used to allow a misting nozzle 34 housed within the interior section 28 of the housing unit 20 to disperse a mist there from. The misting nozzles 34 may protrude there through, be flush with the aperture 32, and/or be recessed from the aperture 32. The misting nozzle 34 may be coupled to a water supply line 36. The water supply line 36 may be housed within the interior section 28 and provide water to the misting nozzles 34. The water supply line 36 may be coupled to a water pump and water supply for supplying water to the misting nozzles 34. In accordance with one embodiment, the misting nozzles 34 may be movable to adjust the direction and/or angle of flow of the mist exiting the misting nozzles 34. The misting nozzles 34 may also be adjustable to change the amount of water being dispersed through the misting nozzles 34.

A cap 38 may be coupled to a bottom end of the housing unit 20. The cap 38 may be positioned over the opening 30 formed through the housing unit 20. The cap 38 may be used to control the direction of the airflow directed out of the opening 30. In accordance with one embodiment, a plurality of channels 40 may be formed in the cap 38. The channels 40 may be formed around a perimeter of the cap 38. The channels 40 may allow the airflow to be directed out from the cap 38 thereby allowing the cap 38 to control the direction of the airflow directed out of the opening 30. Since the cap 38 blocks and directs the airflow out of the channels 40, the airflow exiting the channels 40 may come out with an increase in velocity as compared to an embodiment with no cap 38. It should be noted that while the cap 38 and housing unit 20 may be described above as being separate elements, the cap 38 and housing unit 20 may be integral to one another such that the cap 38 and housing unit 20 may be formed as a single unit.

In the present embodiment, the channels 40 may be "V" shaped channels. The "V" shaped channels may extend down and away from the cap 38 thereby forming a trough 40A. The troughs 40A may be angled downward. The angle of the troughs may be anywhere from 15° to 90°. The angle of the trough 40A may be based on the area one wishes to cover.

Each of the misting nozzles 34 may be positioned above and/or within an individual trough 40A. While the present embodiment shows a misting nozzle 34 positioned above each trough 40A, there may be embodiments where misting nozzles 34 may be positioned in every other trough 40A, every third trough 40A or any pattern/layout a user may like.

In operation, when the fan unit 12 is activated, airflow generated by the fan unit 12 may be directed down the opening 30 formed in the housing unit 20. The airflow may be directed out of the plurality of troughs 40A formed in the cap 38. The troughs 40A force the airflow out at a predefined direction and at a greater speed. A misting nozzle 34 may be positioned within or above a top section of an individual trough 40A. When the misting nozzle 34 disperses a mist, the airflow from the troughs 40A forces the mist out a further distance, thereby extending the cooling area of the misting system 10.

The foregoing description is illustrative of particular embodiments of the invention, but is not meant to be a limitation upon the practice thereof. The following claims, including all equivalents thereof, are intended to define the scope of the invention.

What is claimed is:

1. A misting system comprising:
   a fan unit;
   a housing having an opening formed there through, the fan unit positioned within the opening;
   a plurality of apertures formed in a bottom section of the housing;
   a plurality of misting nozzles, wherein an individual nozzle is positioned proximate each aperture;
   a cap positioned over the opening in a bottom section of the housing; and
   a plurality of channels formed in the cap, wherein a channel is aligned with each of the plurality of misting nozzles, wherein each of the plurality of channels extend down and away from the cap forming a trough.

2. The misting system of claim 1, comprising a water line positioned within the housing and coupled to the plurality of misting nozzles.

3. The misting system of claim 1, comprising a mounting unit coupled to the fan unit.

4. The misting system of claim 3, wherein the mounting unit comprises:

a mounting bracket; and a screen coupled to the mounting bracket.

5. The misting system of claim 1, wherein the fan is an axial fan.

6. The misting system of claim 1, wherein the plurality of channels extend down and away from the cap forming a trough, each trough angled downward from 15° to 90°.

7. The misting system of claim 1, wherein the housing unit comprises:

an inner wall, the inner wall forming a perimeter of the opening;

an outer wall coupled to the inner wall, the outer wall diverging away from the inner wall forming a hollow interior section of the housing unit.

8. The misting system of claim 1, wherein each of the plurality of misting nozzles are movable to adjust an angle thereof.

9. The misting system of claim 1, wherein each of the plurality of misting nozzles are adjustable to change an amount of water being dispersed.

10. A misting system comprising:

a fan unit;

a housing having a hollow interior;

an opening formed through a central area of the housing, the fan unit positioned within the opening;

a plurality of apertures formed in a bottom section of the housing;

a misting distribution unit positioned within the hollow interior of the housing unit;

a plurality of misting nozzles of the misting distribution unit, wherein an individual misting nozzle dispersing a mist out of each aperture;

a cap positioned over the opening in a bottom section of the housing; and a plurality of channels formed in the cap, wherein a channel is aligned with each of the plurality of misting nozzles, wherein each of the plurality of channels extend down and away from the cap forming a trough.

11. The misting system of claim 10, comprising a mounting unit coupled to the fan unit.

12. The misting system of claim 11, wherein the mounting unit comprises:

a mounting bracket; and a screen coupled to the mounting bracket.

13. The misting system of claim 10, wherein the fan is an axial fan.

14. The misting system of claim 10, wherein the plurality of channels extend down and away from the cap forming a trough, each trough angled downward from 15° to 90°.

15. The misting system of claim 10, wherein the housing unit comprises:

an inner wall, the inner wall forming a perimeter of the opening;

an outer wall coupled to the inner wall, the outer wall diverging away from the inner wall forming the hollow interior section of the housing unit.

16. The misting system of claim 10, wherein each of the plurality of misting nozzles are movable to adjust an angle thereof and to change an amount of water being dispersed.

17. A misting system comprising:

an axial fan unit;

a housing having a hollow interior section;

an opening formed through the housing, the fan unit positioned within the opening;

a plurality of apertures formed in a bottom section of the housing;

a misting distribution unit positioned within the interior of the housing;

an individual nozzle of the misting distribution unit distributing a mist out of each aperture;

a plurality of channels formed over the opening, wherein a channel is aligned with each of the plurality of misting nozzles, the plurality of channels extending down and away from the opening forming a trough; and a mounting unit coupled to the fan unit.

18. The misting system of claim 17, wherein the housing unit comprises:

an inner wall, the inner wall forming a perimeter of the opening;

an outer wall coupled to the inner wall, the outer wall diverging away from the inner wall forming the hollow interior section of the housing unit.

\* \* \* \* \*